United States Patent
Rundberg

(10) Patent No.: US 6,247,624 B1
(45) Date of Patent: Jun. 19, 2001

(54) CARRIER DEVICE FOR A POWER-DRIVEN WORK TOOL

(75) Inventor: Leena Rundberg, Jönköping (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 09/314,749

(22) Filed: May 19, 1999

(30) Foreign Application Priority Data

Jun. 3, 1998 (SE) .................................................. 9801873

(51) Int. Cl.$^7$ ........................................................ A45F 3/04
(52) U.S. Cl. ........................ 224/259; 224/220; 224/234; 224/604
(58) Field of Search .................................. 224/259, 260, 224/257, 268, 234, 220, 604

(56) References Cited

U.S. PATENT DOCUMENTS

| | | | | |
|---|---|---|---|---|
| 79,761 | * | 7/1868 | Howell | 224/272 |
| 5,388,739 | * | 2/1995 | Gargan | 224/604 |
| 5,758,809 | * | 6/1998 | Bonner | 224/259 |
| 5,816,460 | * | 10/1998 | Cook | 224/604 X |
| 5,913,464 | * | 6/1999 | Haberlein | 224/259 |
| 5,954,249 | * | 9/1999 | Panth | 224/234 |

FOREIGN PATENT DOCUMENTS

WO94/09674 * 5/1994 (WO) .................................. 224/257

* cited by examiner

*Primary Examiner*—Gregory M. Vidovich
*Assistant Examiner*—Maerena W. Brevard
(74) *Attorney, Agent, or Firm*—Pearne & Gordon LLP

(57) ABSTRACT

A carrier device for a power-driven work tool, such as a clearing saw or the like, having at least one shoulder strap (10) and/or a waist belt (14). The work tool is suspended from the carrier device by a supporting rope (18). The supporting rope has ends that are connected to the carrier device. In order to facilitate the use of the tool on sloping or hilly work surfaces, a hip pad (17) is slidably secured to the supporting rope and the work tool is suspended from the hip pad. The hip pad and work tool are thus slidably movable along the supporting rope (18) so as to enable the work tool to be positioned in a desired working position.

12 Claims, 2 Drawing Sheets

CARRIER DEVICE FOR A POWER-DRIVEN WORK TOOL

BACKGROUND OF THE PRESENT INVENTION

1. Field of the Invention

The present invention relates to a carrier device for a power-driven work tool, such as a clearing saw or the like, the carrier device comprising a harness having at least one shoulder strap and/or a waist belt.

2. Description of the Related Art

A harness is often used when working with clearing saws and similar portable power tools to facilitate carrying of the tool. Harnesses used for this purpose have included a hip pad suspended from the harness by straps which are more or less fixed to the hip pad and to the front and rear portion of the harness. By this arrangement, the position of the hip pad relative to the harness is fixed and cannot be changed without adjusting the length of the straps. In some cases, this may result in uncomfortable and strenuous working positions, particularly when working on hilly and sloping surfaces, as is often the case when using this type of tool.

SUMMARY OF THE INVENTION

The present invention is directed toward eliminating the above-mentioned disadvantage in the art, and providing a carrier device which enables positioning and use of the tool in more comfortable and ergonomically-suitable working positions, even when the tool is used on sloping and hilly work surfaces.

In accordance with the present invention, a carrier device includes a harness, a hip pad, and a supporting rope interconnecting the hip pad and the harness. The harness includes at least one strap that is adapted to be secured to, or around, the user. The hip pad is slidably secured to the supporting rope. Ends of the supporting rope are affixed to the harness. The work tool is releasably secured to the hip pad, and the hip pad and work tool are slidable along the supporting rope to permit desired adjustment of the working position of the work tool.

In further accordance with the present invention, the hip pad defines a passage through which the supporting rope extends. The passage is curved for better load distribution, and preferably is concave facing upwardly toward the harness. The passage is integrally provided by the hip pad.

In further accordance with the present invention, the harness includes a breast plate and a back plate, and ends of the supporting rope are affixed to the breast and back plate, respectively. The harness includes a pair of shoulder straps that are connected to the breast and back plates, and also includes a waist belt to further secure the harness about the user.

BRIEF DESCRIPTION OF THE DRAWINGS

These and further features of the present invention will be apparent with reference to the following description and drawings, wherein.

DETAILED DESCRIPTION OF THE PREFERRED EMBODIMENT

Figure 1:
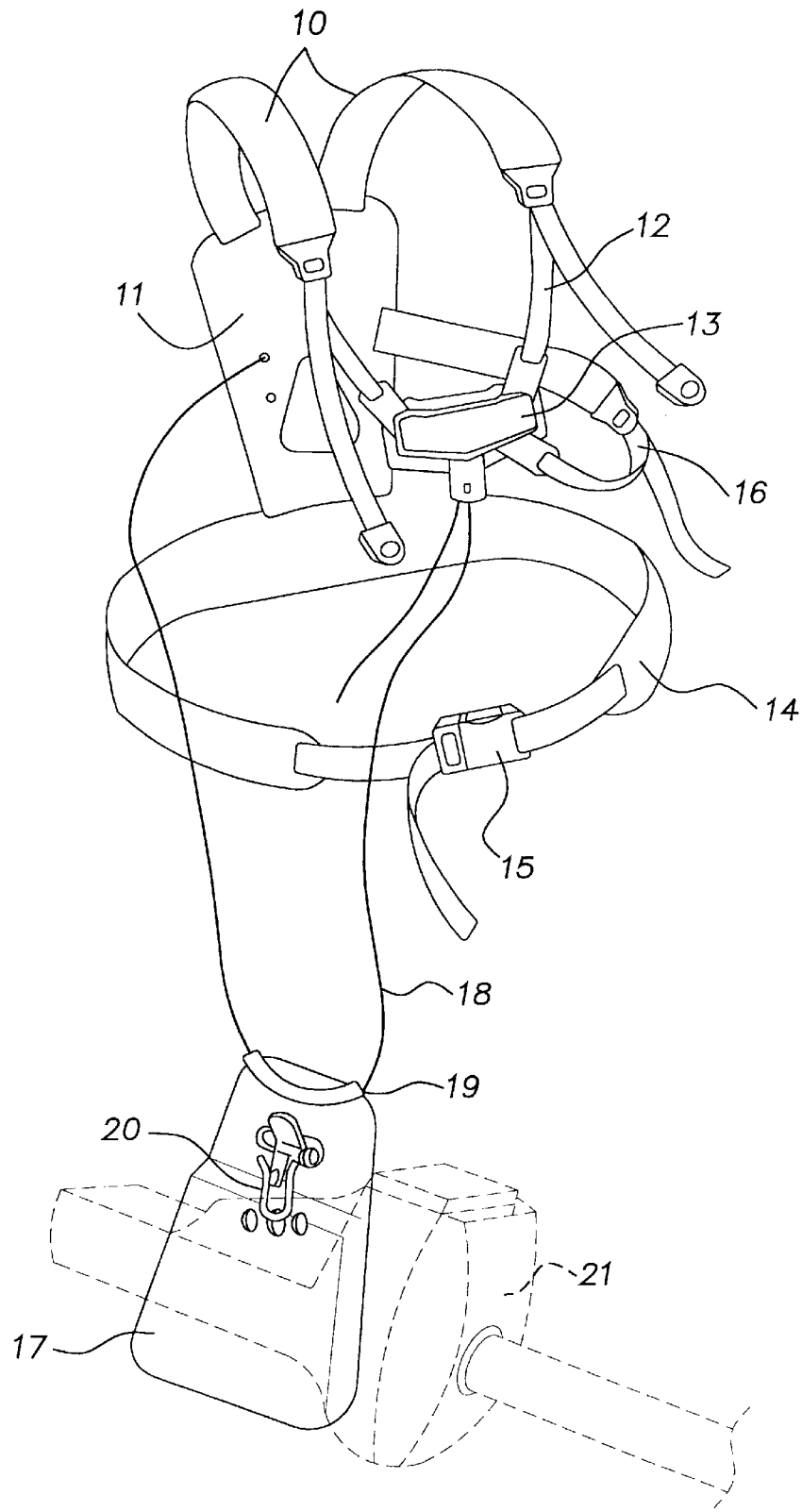
FIG. 1 is a perspective view of a preferred embodiment of the carrier device according to the present invention.
Figure 2:
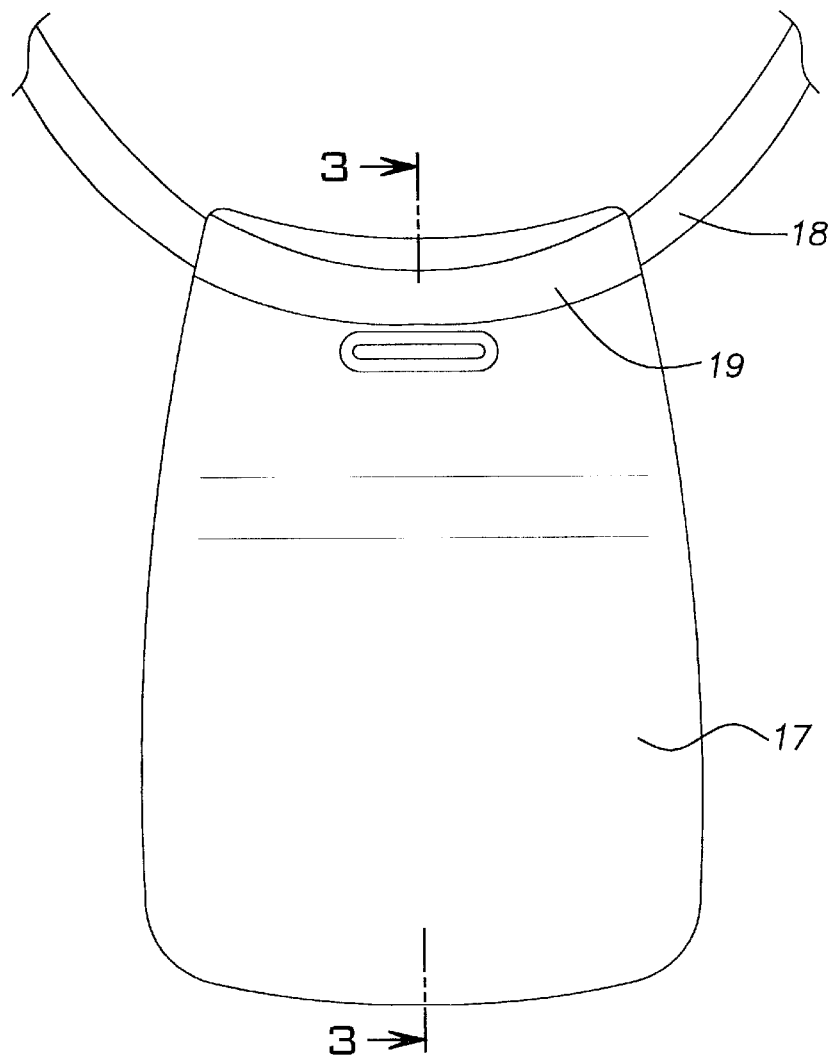
FIG. 2 is a side elevation of a hip pad of the carrier device according to the present invention.
Figure 3:
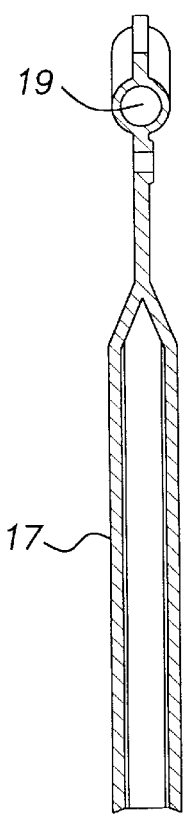
FIG. 3 is a cross section of the hip pad as seen along line III—III in FIG. 2.

The carrier device according to the present invention illustrated in the drawings comprises two shoulder straps 10. One end of each shoulder strap is secured to a back plate 11 and the other end thereof is connected to a breast plate 13 by means of adjustable straps 12. The back plate 11 is connected to a waist belt 14, the ends of which are adjustably connected to a dismountable buckle 15 in a conventional manner. Furthermore, the carrier device has a relieving belt 16 for taking up lateral forces resulting from the tool being carried on one side of the operator.

As shown in FIG. 1, a hip pad 17 is suspended from a supporting rope 18. The ends of the supporting rope 18 are attached to the back plate 11 and breast plate 13, respectively. The supporting rope 18 extends through a tubular passage 19 provided in the hip pad 17. The passage 19 is curved for improved load distribution. The hip pad 17 is provided with an attachment 20 for supporting a power driven work tool 21 such as a clearing saw, which is shown partially and in broken lines in the drawing.

The passage 19 of the hip pad 17 has an inner diameter which is larger than the diameter of the supporting rope 18 whereby the supporting rope is easily slidable through the passage. This means that the position of the hip pad 17 can be easily altered by moving the hip pad along the supporting rope 18. The operator may thus easily adjust the position of the work tool 21, as desired. According to the slope of the ground or work surface being worked upon, the work tool 21 and the hip pad 17 may be easily moved forward or backward along the supporting rope 18 as preferred by the operator. Thus, in any working situation the device according to the invention makes it possible to adjust the position of the work tool in order to obtain the best possible working position.

The hip pad 17 is preferably made of plastic, and the passage 19 is preferably integral with the hip pad body.

It is also within the scope of the invention to omit the shoulder straps and to use a waist strap or belt to which the ends of the supporting rope 18 are attached.

As an alternative to the described passage 19, it is within the framework of the invention to use other means for movably suspending the work tool 21 from the supporting rope 18. The work tool may, for example, be supported from the supporting rope by means of loops or pulleys or similar means allowing the work tool to be moved along the supporting rope in order to enable adjustment of the work tool to the required working position.

It is considered apparent that the present invention is capable of numerous modifications, alterations, and substitutions of parts and, accordingly is not limited to the illustrated and preferred embodiments. For example, in some applications it may be desired to integrally provide the passage with the work tool so as to permit the work tool to be directly secured to the supporting rope without the intervening hip pad. Accordingly, the scope of the present invention is only defined by the claims appended hereto.

What is claimed is:

1. A carrier device for a power-driven work tool, said carrier device comprising a harness, a tubular passage (19), a supporting rope (18) extending through said tubular passage, said harness having at least one strap (10), wherein the work tool is suspended from the tubular passage, the supporting rope having ends that are connected to the harness and the work tool is movable along said supporting rope and a hip pad (17), said hip pad being movably suspended from the supporting rope (18) and including an attachment (20) to which the work tool is secured, wherein the hip pad includes the passage through which the supporting rope extends.

2. The carrier device according to claim 1, wherein the ends of the supporting rope are connected to said at least one strap (10).

3. The carrier device according to claim 2, wherein said at least one strap is a shoulder strap.

4. The carrier device according to claim 1, wherein the passage (19) is integrally formed with the hip pad (17).

5. The carrier device according to claim 1, wherein the passage is curved and the supporting rope slidingly extends through said passage.

6. The carrier device according to claim 1, wherein said at least one strap is a shoulder strap.

7. The carrier device according to claim 6, wherein said harness includes a back plate and a breast plate that are connected to said shoulder strap, one of said ends of the supporting rope being secured to said back plate and the other of said ends of said supporting rope being secured to said breast plate.

8. The carrier device according to claim 7, further comprising a hip pad (17), said hip pad being movably suspended from the supporting rope (18) and including an attachment (20) to which the work tool is secured.

9. The carrier device according to claim 8, wherein the hip pad (17) includes the passage (19) through which the supporting rope (18) extends.

10. The carrier device according to claim 9 wherein the passage is curved and the supporting rope slidingly extends through said passage.

11. The carrier device according to claim 10, further comprising a waist belt (14).

12. A carrier device for a power-driven work tool, said carrier device comprising a harness, a support rope, and a hip pad (17) having a curved passage (19) through which said supporting rope slidingly extends, said hip pad being movably suspended from the support rope, said harness having at least one strap (10), and said hip pad having an attachment (20), wherein the work tool is secured to said attachment and thereby suspended from the supporting rope (18), the supporting rope having ends that are connected to the harness and the work tool is movable along said supporting rope.

* * * * *